United States Patent [19]
Berg

[11] Patent Number: 6,045,339
[45] Date of Patent: Apr. 4, 2000

[54] WAVE MOTOR

[76] Inventor: John L. Berg, 415 Ward Dr., Oak Hill, Fla. 32759

[21] Appl. No.: 09/009,704

[22] Filed: Jan. 20, 1998

[51] Int. Cl.[7] .................................................. F04B 23/08
[52] U.S. Cl. ............................................... 417/332
[58] Field of Search ..................................... 417/332, 331, 417/330, 333; 60/501, 500, 506, 505

[56] References Cited

U.S. PATENT DOCUMENTS

| | | | |
|---|---|---|---|
| 1,018,678 | 2/1912 | Nelson | 417/332 |
| 3,274,941 | 9/1966 | Parr | 417/331 |
| 4,302,161 | 11/1981 | Berg | 417/333 |
| 4,413,956 | 11/1983 | Berg | 417/332 |
| 4,552,514 | 11/1985 | Hagen | 417/332 |
| 4,792,290 | 12/1988 | Berg | 417/332 |
| 5,136,987 | 8/1992 | Schechter et al. | 123/48 B |
| 5,842,838 | 12/1998 | Berg | 417/331 |

*Primary Examiner*—Thomas N. Moulis
*Assistant Examiner*—Mahmoud M Gimte
*Attorney, Agent, or Firm*—David Kiewit

[57] ABSTRACT

A wave energy harvesting apparatus of the type employing laterally spaced-apart floats arranged so that the up and down movements of the floats in response to the wave motion are out of phase with each other and can be used to drive one or more pumps is configured to maintain a fixed orientation with respect to the direction of wave motion and is adapted, on the basis of local wave characteristics, to maximize the average power output. This adaptation may be provided by means including initial selection of the overall size of the apparatus and subsequent adjustments made to the pumping mechanism. The preferred pumping arrangement employs three pumps, each having a piston with one end removably pivotally attached to a pumping arm near one of the floats. Each piston reciprocates, with a stroke much longer than its diameter, within a respective neutrally buoyant cylinder that is pivotally attached to a body float.

7 Claims, 2 Drawing Sheets

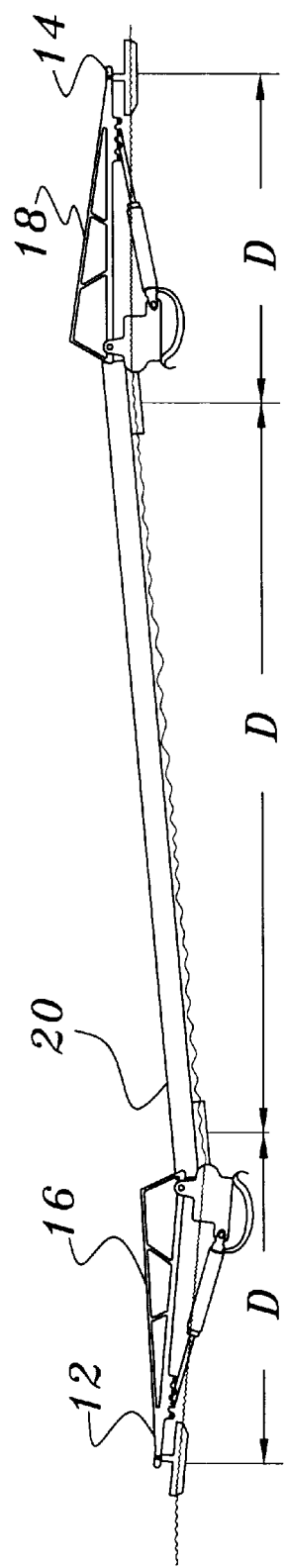
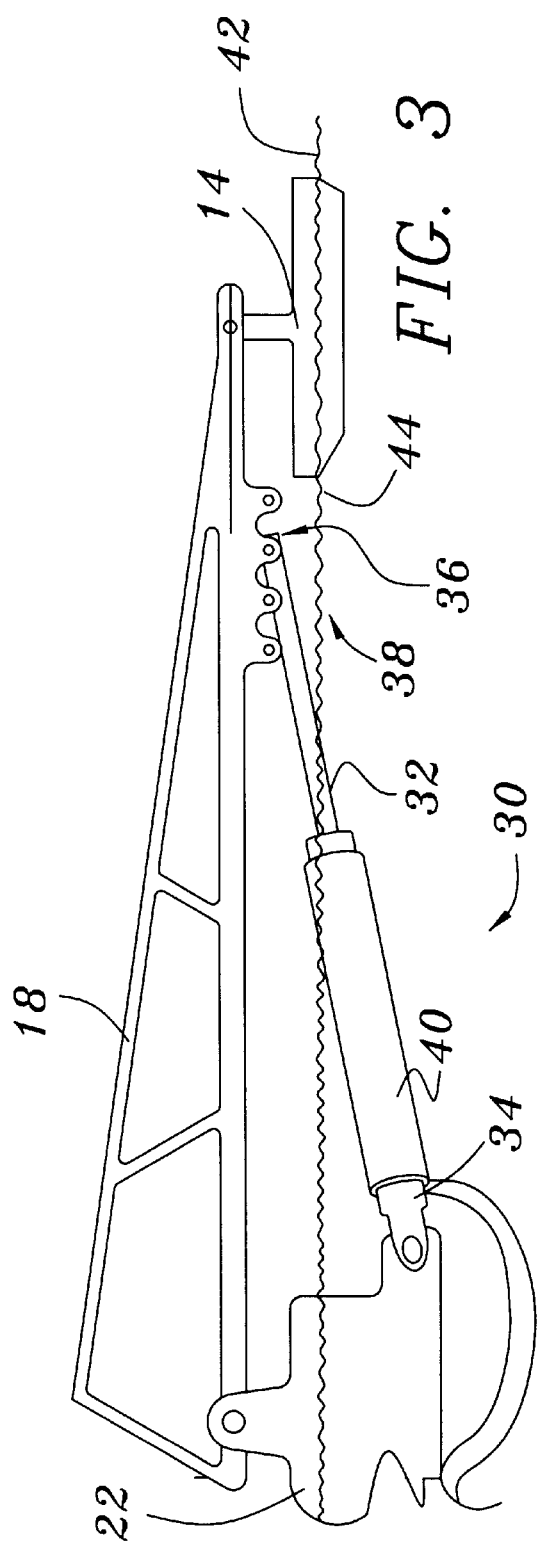

WAVE MOTOR

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to wave-motor apparatus for converting the kinetic energy contained in waves on a body of liquid to another form and includes using wave energy to drive a reciprocating pump.

2. Background Information

Many inventors have sought to harvest energy from the waves that are always present on a large body of water. Among the proposed devices are many using the wave energy to cause a first portion of the apparatus to move relative to a second portion of the apparatus in a reciprocating fashion. One group of these machines typically have a float portion which floats on the surface of the body of liquid so as to be moved responsive to the wave motion with respect to a hydrodynamically resistive portion of the apparatus that extends beneath a surface region of wave activity for at least most of the waves to be encountered so as to remain relatively stationary. Exemplar among the apparatus in the first group are those taught in the inventor's U.S. Pat. No. 5,842,838, the disclosure of which is herein incorporated by reference. A second group of wave energy harvesting apparatus employs laterally spaced-apart floats arranged so that the up and down movements of the floats in response to the wave motion are out of phase with each other and can be used to drive a pump. Notable among machines of this sort are three disclosed by the present applicant in his issued U.S. Pat. Nos. 4,302,161, 4,413,956, and 4,792,290, the disclosures of which are herein incorporated by reference.

BRIEF SUMMARY OF THE INVENTION

The invention provides an improved wave energy harvesting apparatus of the type employing laterally spaced-apart floats arranged so that the up and down movements of the floats in response to the wave motion are out of phase with each other and can be used to drive one or more pumps. In the preferred embodiment of the invention, the apparatus is configured to maintain a fixed orientation with respect to the direction of wave motion and is adapted, on the basis of local wave characteristics, to maximize the average power output. This adaptation may be provided by means including initial selection of the overall size of the apparatus and subsequent adjustments made to a pumping mechanism.

It is an object of the invention to provide wave-energy-harvesting apparatus of the type having laterally spaced-apart floats arranged so that the up and down movements, in response to wave motion, of floats at the ends of pump arms are out of phase with corresponding movements of a main body of the apparatus, wherein the size and shape of the apparatus is selected to maximize the amount of energy extracted at a predetermined location.

It is an additional object of the invention to provide a wave-driven reciprocating pump having a stroke that may be adjusted so as to provide the most desirable volumetric output and operating pressure within respective ranges of those parameters.

It is a further object of the invention to safeguard a wave-energy-harvesting apparatus of the type having laterally spaced-apart floats arranged so that the up and down movements of the floats in response to the wave motion are out of phase with each other by selection of ballasting means and ballasting amounts such that the apparatus can function safely and with maximized output in stormy conditions characterized by high waves.

It is additionally an object of the invention to provide wave-energy-harvesting apparatus of the type having laterally spaced-apart floats arranged so that the up and down movements, in response to wave motion, of floats at the ends of pump arms are out of phase with corresponding movements of a main body of the apparatus so that the wave motion drives a neutrally buoyant pump comprising a cylinder and a piston wherein one of the cylinder and piston is pivotally attached to the main body and the other of the piston and cylinder, respectively, is attached to the pump arm adjacent the float at the end thereof.

BRIEF DESCRIPTION OF THE SEVERAL VIEWS OF THE DRAWING

FIG. 2 is a partially schematic side elevation view of the apparatus of FIG. 1.

FIG. 3 is a side view of one of the rear arms and a portion of the main body of the apparatus, the view taken as indicated by the double-headed arrow 3—3 in FIG. 1.

DETAILED DESCRIPTION OF THE INVENTION

Figure 1:
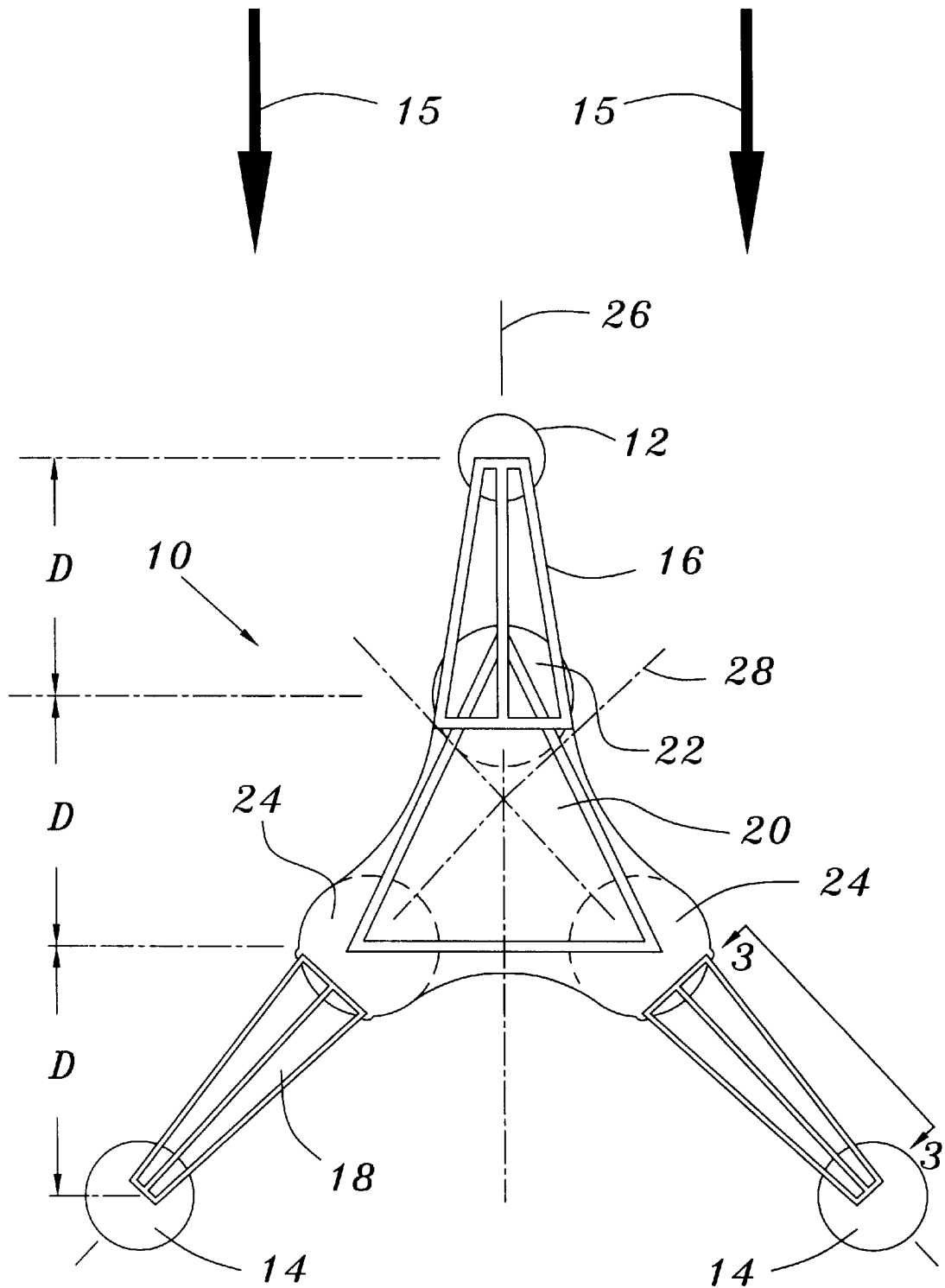
FIG. 1 is a schematic plan view of a preferred wave-energy harvesting apparatus from which some of the trestle members have been omitted from the pump arms in the interest of clarity of presentation.

A wave energy harvesting apparatus 10 of the invention, employing laterally spaced-apart arm floats 12, 14 arranged so that the up and down movements of the arm floats 12, 14 in response to wave motion are out of phase with the respective body floats 22, 24 is shown in FIG. 1. As disclosed in the inventor's U.S. Pat. No. 4,792,290, an apparatus of this configuration is designed to turn and align itself with the direction of wave motion (shown by the set of parallel arrows 15 in FIG. 1). This self-alignment feature, which has been found to turn a preferred apparatus into the desired alignment within one wavelength of a series of waves striking the apparatus from a new direction, ensures that a front arm float 12 is always acted on by a passing wave before that wave acts on either of the rear arm floats 14. This arrangement ensures both that the front arm 16 (i.e., that arm used to attach the front arm float 12 to the main body 20 of the apparatus) is generally aligned with the direction of wave motion, while both of the rear arms 18 are at an angle to that direction. Moreover, as noted in the inventor's U.S. Pat. No. 4,792,290, the pumping arms are radially disposed about the circumference of the main body 20 so that the extended centerlines 26, 28 of the arms 16, 18 do not intersect a float other that the two floats operatively associated with the respective arm. As depicted in FIG. 1, the centerline 26 of the apparatus 10 and of the front arm 16 passes between the two rear main body floats 24, and the centerlines 28 of the two rear arms 18 are tangent to the front main body float 22. This selection of the angular positioning of the arms about the main body ensures that, regardless of the direction from which a wave hits the apparatus 10, that wave can be parallel to no more than one of the pumping arms. This is important, as also noted in U.S. Pat. No. 4,792,290, because a wave parallel to an arm lifts both floats attached to that arm together so that there is no pumping action from that arm.

On any body of water one encounters waves having wavelengths (i.e., crest-to-crest distances) that vary from time to time. A wave-energy harvesting apparatus should function satisfactorily with most of the waves that are expected to be encountered. For any location at which an apparatus of the invention is to be installed, one may determine, from historical data on waves and swells, a wavelength providing a large fraction of the total annual wave energy—i.e., one for which the apparatus should be optimized. Once this wavelength has been selected, a wave-energy harvesting apparatus of the invention 10 is preferably built in accordance with the proportions depicted in the drawing. The distance, measured along the longitudinal axis 26 of the apparatus, from the center of each pump float 12, 14 to the center of its respective main body float 22, 24 should be equal to one-half the selected wavelength (a length denoted as D in FIGS. 1 and 3). If this condition is satisfied (as depicted in FIG. 2) when the front arm float 12 is at the crest of a wave, the front main body float 22 is in a trough. In addition, the main body 20 has its length selected so that the center of buoyancy of the front main body float 22, as measured along the axis 26 of the apparatus 10, is one half the selected wavelength from the center of buoyancy of the two rear main body floats 24. Thus, when the front arm float 12 is at a crest of a wave, the body floats 22, 24 are respectively at a trough and a crest, and the rear arm floats 14 are at a trough. This arrangement provides the most efficient pumping for the selected wavelength.

In a preferred embodiment, all of the pumping arms 16 are interchangeable so as to reduce the cost of manufacture. In order to use three pump arms having the same length (a length that is somewhat longer than the half wavelength dimension D) and still maintain the desired float-to-float spacing along the axis 26 of the apparatus 10, the position at which each arm is pivotally attached to the main body 20 is appropriately shifted from the center of buoyancy of its associated main body float. Thus, die front arm 16 is hingedly attached to the main body 20 along a line slightly aft of the center of buoyancy of the front main body float 22, and each of the rear arms is hingedly attached along a respective line near the circumference of the respective rear main body float 24.

A major improvement in the present apparatus comprises an improved pump geometry. In the apparatus disclosed in U.S. Pat. No. 4,792,290 the reciprocating pump body was generally vertically oriented and comprised a cylinder pivotally attached to the main body of the apparatus. A piston that reciprocated within the cylinder was driven by a pump arm to which it was pivotally attached adjacent the main body of the apparatus and correspondingly distal from the pump float that was driving it. This arrangement provided a relatively short piston stroke and required a correspondingly large cylinder diameter to obtain a suitable volumetric pumping rate. One reason for selecting the generally vertical cylinder alignment was to avoid excess piston wear that might arise in a horizontally oriented pump in which the weight of the cylinder would impose a force on the piston perpendicular to the axis of piston motion.

In the presently preferred embodiment a much different pump 30 is employed. A pump of this sort, with an unrealistically foreshortened pump arm chosen for clarity of presentation, is depicted in FIG. 3. This preferred pump configuration employs a piston 32 having a long stroke and a relatively small diameter. In one specific test model the piston diameter was approximately five centimeters and the stroke length was approximately three and two thirds meters. The piston 32 reciprocates within a cylinder 34 pivotally attached to a main body float 22, 24 so that it can pivot in the same vertical plane in which the pump arm 16 moves. Each cylinder 34 is thus disposed in a relatively horizontal orientation and the free end 44 of its respective piston 32 is pivotally attached to a float arm 16, 18 at a point adjacent the associated pump arm float 12, 14. This arrangement provides a piston stroke substantially longer than what was achieved with the vertically oriented pump taught in U.S. Pat. No. 4,792,290.

In a preferred embodiment, an adjustable attachment means 36 is disposed along the axis of the arm 16 so that the working length of the piston stroke can be changed after the apparatus 10 has been placed in service. The adjustable attachment means 36 may comprise a plurality of mounting holes 38 into which the free piston end 44 can be pivotally pinned; a threaded rod disposed along the arm and cooperating with a threaded end of the piston (not shown); or any of a number of other length adjustment means known in the art. In one embodiment, the piston stroke adjusting means comprised a bar approximately two meters long providing length adjustment in ten centimeter increments over its entire length.

Use of this preferred attachment arrangement allows an operator of the apparatus 10 to change the pump stroke in order to optimize performance and to adapt the pump to provide a user-specified output pressure and volumetric delivery rate. Because the attachment means 36 is preferably above the water line of the apparatus 10, this adjustment can easily be made by two people in a small boat. Moreover, the adjustability feature also allows for the manufacture of a set of pumping apparatuses wherein each apparatus of the set is adjustable to be optimized within a range of expected wave amplitudes and spacings and wherein the entire set is adequate to cover essentially all operating situations. Prior to the provision of this adjustment, a separate, custom-sized apparatus had to be configured for each installation.

The preferred pumping arrangement also provides a greater range of operating parameters controllable by the designer than did the pumping arrangement taught in U.S. Pat. No. 4,792,290. In addition to field-alterable stroke length changes, the apparatus 10 can be designed to operate with a variety of different piston diameters. By selecting appropriate piston diameters, piston strokes and arm float sizes, the apparatus can be designed so that each of the three pumps provides the same output pressure.

Another advantage of the preferred pumping arrangement is that it uses a pump 30 very similar to that disclosed in the inventor's U.S. Pat. No. 5,842,838, which obviates the need for piston rings or other such seals. Doing without piston rings both reduces the cost of manufacture of the apparatus and also reduces the number of materials used in its construction, thereby making the operation of the pump less sensitive to variations in water temperature. In one embodiment, the pump employed both a piston and a cylinder made of the same polymeric material, such as polyvinyl chloride, having a 0.005" (0.0127 cm) difference between the outer diameter of the piston and the inner diameter of the cylinder.

The presently preferred pumping arrangement provides the desired combination of a small bore and long stroke by suspending each piston and cylinder under a respective one of the pumping arms. As noted supra, this generally horizontal disposition of the cylinder had been avoided in earlier embodiments of the invention for fear that the load imposed on the cylinder-piston interface by the weight of a cylinder and piston would cause excess wear. In the presently preferred embodiment, this problem is entirely avoided by wrapping the cylinder in a buoyant jacket 40 having its size and buoyancy selected to compensate for the weight of the cylinder 34 and to render the jacketed cylinder 42 neutrally buoyant. Moreover, the piston 32 is rendered neutrally buoyant by using an air-cored or foam-cored closed end tube as the piston. In a preferred embodiment, a closed-cell foam is used to fill the piston tube in order to prevent a change in effective piston mass that would occur if water were to leak into a hollow, air-cored, piston tube.

It may be noted that in the preferred embodiment, as depicted in FIG. 3, the cylinder 34 is pivotally attached to the main body float 22, 24 and remains entirely below the water line 42, while that end 44 of the piston 32 distal from the cylinder 34 is pivotally attached to the pumping arm 16 adjacent the pumping float 12, 14 and above the water line 42. One could, of course, reverse the relative positions of the piston and cylinder so that the cylinder was pivotally attached to the pumping arm adjacent the pumping float, and the distal end of the piston was attached to the main body float. This arrangement, which would have varying portions of the cylinder above the water line, would be more difficult to make neutrally buoyant in the interest of reducing frictional wear.

In comparison to the present preferred apparatus 10, the older apparatus of U.S. Pat. No. 4,792,290 was relatively buoyant and protruded much farther above the water line. In order to protect the apparatus of U.S. Pat. No. 4,792,290 against occasional high waves, a provision was made to allow it to sink in high seas, to remain submerged and inactive while the high seas persisted, and to later surface and resume operation. Although this protected the apparatus, it reduced the annual amount of energy that could be harvested. Because a large fraction of the total annual wave energy at any location may occur during occasional stormy periods, the apparatus was redesigned to be less buoyant. In the present preferred embodiment, over 90% of the total weight contained within the apparatus is water. In the earlier embodiment of U.S. Pat. No. 4,792,290, only 80% of the total weight was water ballast. The present apparatus, which is much more nearly neutrally buoyant can remain active during periods of high seas and can thereby harvest more energy per year than could the previous design.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. In a wave energy harvesting machine of the type having a plurality of laterally spaced-apart floats arranged so that the up and down movements of the floats in response to wave motion on a body of water are out of phase with each other and can be used to drive a pump comprising a piston having a predetermined diameter, the piston reciprocating over a stroke length within a cylinder pivotally attached to one of the floats, the piston comprising a free end pivotally attached to a pumping arm connecting the one of the floats to a second float, an improvement comprising:

means for pivotally attaching the free end of the piston to the pumping arm adjacent the second float so that the stroke length is larger than the predetermined diameter of the piston; and means for rendering the cylinder neutrally buoyant.

2. The improved wave energy harvesting machine of claim 1 wherein the means for attaching the free end of the piston to the pumping arm comprises a plurality of attachment points spaced along the pumping arm whereby the free end of the piston is adapted to be selectively movable from one attachment point to another so as to change the stroke length of the piston.

3. In a wave energy harvesting machine of the type having a plurality of laterally spaced-apart floats arranged so that the up and down movements of the floats in response to wave motion on a body of water are out of phase with each other and can be used to drive a pump comprising a piston having a predetermined diameter, the piston reciprocating over a stroke length within a cylinder pivotally attached to one of the floats, the piston comprising a free end pivotally attached to a pumping arm connecting the one of the floats to a second float, an improvement wherein the cylinder is adapted to be neutrally buoyant when the machine is disposed in the water.

4. The improved wave energy harvesting machine of claim 3 further comprising means for pivotally attaching the free end of the piston to the pumping arm adjacent the second float so that the stroke length is much larger than the predetermined diameter of the piston.

5. The improved wave energy harvesting machine of claim 4 wherein the means for attaching the free end of the piston to the pumping arm comprise a plurality of attachment points spaced along the pumping arm whereby the free end of the piston is adapted to be selectively movable from one of the attachment points to another so as to change the stroke length of the piston.

6. In a wave energy harvesting machine of the type comprising a main body supported by three main body floats, the machine adapted to be moored on a body of water by a mooring means attached to a front one of the three main body floats, the front main body float linked by a front pumping arm to a front pump arm float, each of the other two main body floats linked by a respective rear pumping arm to a respective rear pump arm float, each pumping arm hingedly connected adjacent one of its two ends to the respective pump arm float, each pumping arm hingedly connected adjacent the second of its two ends to the main body adjacent the respective main body float so that the up and down movements of the respective pump arm float and respective main body float can be used to drive a pump comprising a piston reciprocating within a cylinder pivotally attached to the main body adjacent the respective main body float, an improved selection of dimensions for adapting the machine to a predetermined wave trough-to-crest spacing wherein:

a first distance between a center of buoyancy of tie front pump arm float and a center of buoyancy of the front main body float is equal to the predetermined spacing;

a second distance, measured along a line drawn between the front pump arm float and the front main body float, between the front main body float and either of the other two main body floats is equal to the predetermined spacing; and a third distance, measured along the line drawn between the front pump arm float and the front main body float, between a center of buoyancy of either of the other two main body floats and a center of buoyancy of the pump arm float respectively associated therewith is equal to the predetermined spacing.

7. The improved wave energy harvesting machine of claim 6 wherein all three of the pump arms have the same arm length, the arm length longer than the predetermined spacing.

* * * * *